US011050669B2

(12) United States Patent
Bartlett

(10) Patent No.: US 11,050,669 B2
(45) Date of Patent: Jun. 29, 2021

(54) METHOD AND SYSTEM FOR MANAGING, OPTIMIZING, AND ROUTING INTERNET TRAFFIC FROM A LOCAL AREA NETWORK (LAN) TO INTERNET BASED SERVERS

(71) Applicant: Robert Michael Norman Bartlett, West Kelowna (CA)

(72) Inventor: Robert Michael Norman Bartlett, West Kelowna (CA)

(73) Assignee: AAA INTERNET PUBLISHING INC., West Kelowna (CA)

( * ) Notice: Subject to any disclaimer, the term of this patent is extended or adjusted under 35 U.S.C. 154(b) by 343 days.

(21) Appl. No.: 14/047,678

(22) Filed: Oct. 7, 2013

(65) Prior Publication Data

US 2014/0101331 A1 Apr. 10, 2014

Related U.S. Application Data

(60) Provisional application No. 61/710,026, filed on Oct. 5, 2012.

(51) Int. Cl.
*H04L 12/801* (2013.01)
*H04L 12/725* (2013.01)
*H04L 12/715* (2013.01)

(52) U.S. Cl.
CPC ............ *H04L 47/13* (2013.01); *H04L 45/302* (2013.01); *H04L 45/306* (2013.01); *H04L 45/04* (2013.01)

(58) Field of Classification Search
CPC .................................. H04L 47/13; A63F 9/24
USPC ............................................ 709/233; 463/42
See application file for complete search history.

(56) References Cited

U.S. PATENT DOCUMENTS

| 5,351,239 A | 9/1994 | Black et al. |
| 6,215,789 B1 * | 4/2001 | Keenan ................. H04L 12/413 370/395.53 |
| 6,973,037 B1 | 12/2005 | Kahveci |
| 7,609,671 B1 * | 10/2009 | Nuriyev et al. ............. 370/328 |
| 7,633,869 B1 | 12/2009 | Morris |

(Continued)

OTHER PUBLICATIONS

Office Action issued in U.S. Appl. No. 15/335,304 dated Jan. 9, 2019 [Related Application].

(Continued)

*Primary Examiner* — Meng Vang
(74) *Attorney, Agent, or Firm* — Venable LLP; Michele V. Frank

(57) ABSTRACT

A method and system for optimizing internet traffic from a Local Area Network (LAN) to an internet based server utilizes a specific gamer private network (GPN) for the classified latency sensitive internet data. The method includes the steps of creating a gateway computer or a master-slaver computer (device) system within a local area network (LAN), and making this gateway computer control the internet data from any device within the LAN to an outside internet based server. The gateway computer sorts the internet data into various categories, including latency sensitive, bandwidth sensitive and exclusion that is neither latency sensitive nor bandwidth sensitive. Based on these classification results, the internet data within various categories are sent out via the respective routes, so as to achieve a smooth and efficient internet data transmission.

21 Claims, 7 Drawing Sheets

(56) References Cited

U.S. PATENT DOCUMENTS

| | | | |
|---|---|---|---|
| 7,673,056 B1* | 3/2010 | Inbaraj | H04L 67/16 709/217 |
| 7,730,157 B2 | 6/2010 | Baratto et al. | |
| 7,925,281 B2 | 4/2011 | Cahn | |
| 7,983,148 B1* | 7/2011 | Abramson et al. | 370/217 |
| 8,589,536 B2 | 11/2013 | Karenos et al. | |
| 8,739,269 B2 | 5/2014 | Dargis | |
| 9,160,711 B1 | 10/2015 | Sweet | |
| 9,614,870 B2 | 4/2017 | Bartlett et al. | |
| 2001/0052008 A1 | 12/2001 | Jacobus | |
| 2002/0009079 A1 | 1/2002 | Jungck et al. | |
| 2002/0026321 A1 | 2/2002 | Faris et al. | |
| 2002/0145974 A1* | 10/2002 | Saidi et al. | 370/230 |
| 2003/0086425 A1 | 5/2003 | Bearden et al. | |
| 2003/0097442 A1 | 5/2003 | Farhat et al. | |
| 2003/0107990 A1 | 6/2003 | Herschleb et al. | |
| 2003/0128710 A1 | 7/2003 | Fedyk et al. | |
| 2004/0100953 A1 | 5/2004 | Chen et al. | |
| 2004/0148520 A1 | 7/2004 | Talpade et al. | |
| 2004/0221296 A1* | 11/2004 | Ogielski | H04L 12/24 719/313 |
| 2005/0055708 A1* | 3/2005 | Gould et al. | 725/25 |
| 2005/0119996 A1 | 6/2005 | Ohata et al. | |
| 2005/0180416 A1 | 8/2005 | Jayawardena et al. | |
| 2005/0232193 A1* | 10/2005 | Jorgensen | 370/329 |
| 2005/0270982 A1* | 12/2005 | McBeath | H04L 1/205 370/252 |
| 2006/0053021 A1 | 3/2006 | Bystedt | |
| 2006/0130107 A1 | 6/2006 | Gonder et al. | |
| 2006/0153089 A1 | 7/2006 | Silverman | |
| 2006/0174160 A1 | 8/2006 | Kim | |
| 2006/0244818 A1 | 11/2006 | Majors et al. | |
| 2007/0016687 A1 | 1/2007 | Agarwal et al. | |
| 2007/0070914 A1 | 3/2007 | Abigail | |
| 2007/0086338 A1 | 4/2007 | Robert et al. | |
| 2008/0056586 A1 | 3/2008 | Cheng et al. | |
| 2008/0092128 A1 | 4/2008 | Corry et al. | |
| 2008/0101368 A1* | 5/2008 | Weinman | H04L 45/00 370/392 |
| 2008/0140817 A1 | 6/2008 | Agarwal et al. | |
| 2008/0144563 A1* | 6/2008 | Hart | H04B 7/18584 370/316 |
| 2008/0279213 A1 | 11/2008 | Tong et al. | |
| 2008/0293494 A1* | 11/2008 | Adiraju | G07F 17/32 463/42 |
| 2009/0067328 A1* | 3/2009 | Morris et al. | 370/230.1 |
| 2009/0203375 A1 | 8/2009 | Gisby et al. | |
| 2009/0262741 A1 | 10/2009 | Jungck et al. | |
| 2009/0280908 A1* | 11/2009 | Carroll et al. | 463/42 |
| 2009/0282127 A1 | 11/2009 | LeBlanc et al. | |
| 2010/0036954 A1 | 2/2010 | Sakata et al. | |
| 2010/0046527 A1 | 2/2010 | Li et al. | |
| 2010/0125851 A1* | 5/2010 | Singh et al. | 718/104 |
| 2010/0185961 A1 | 7/2010 | Fisher et al. | |
| 2010/0269044 A1 | 10/2010 | Ivanyi et al. | |
| 2010/0325309 A1* | 12/2010 | Cicic | H04L 45/02 709/238 |
| 2011/0052008 A1 | 3/2011 | Holsing et al. | |
| 2011/0122812 A1 | 5/2011 | Jeong et al. | |
| 2011/0197132 A1 | 8/2011 | Escoda et al. | |
| 2011/0202656 A1 | 8/2011 | Gentile et al. | |
| 2011/0236665 A1 | 9/2011 | Roque et al. | |
| 2011/0246665 A1* | 10/2011 | Vange et al. | 709/233 |
| 2011/0296303 A1 | 12/2011 | Duquene et al. | |
| 2012/0069748 A1 | 3/2012 | Van Den Bogaert | |
| 2012/0190444 A1 | 7/2012 | Fujisawa et al. | |
| 2012/0311107 A1 | 12/2012 | Van der Merwe et al. | |
| 2012/0314077 A1 | 12/2012 | Clavenna, II et al. | |
| 2013/0097349 A1* | 4/2013 | Lu et al. | 710/122 |
| 2013/0279354 A1 | 10/2013 | Ekman et al. | |
| 2014/0098662 A1 | 4/2014 | Jungck et al. | |
| 2014/0259109 A1 | 9/2014 | Houston et al. | |
| 2014/0344331 A1 | 11/2014 | Johns et al. | |
| 2015/0341312 A1 | 11/2015 | Ezell et al. | |
| 2015/0373135 A1 | 12/2015 | McKeown et al. | |

OTHER PUBLICATIONS

Office Action issued in U.S. Appl. No. 15/335,308 dated Jan. 4, 2019 [Related Application].

Advisory Action issued in U.S. Appl. No. 15/335,304 dated Jun. 25, 2018 [Related Application].

Office Action issued in related U.S. Appl. No. 15/335,308, dated May 21, 2019.

Office Action issued in U.S. Appl. No. 15/335,308, dated Mar. 20, 2020.

Office Action issued in U.S. Appl. No. 15/335,308, dated Sep. 20, 2019.

Notice of Allowance issued in U.S. Appl. No. 15/335,304, dated Aug. 14, 2019.

Office Action issued in U.S. Appl. No. 15/825,849, dated Aug. 20, 2019.

Office Action issued in U.S. Appl. No. 15/825,849, dated Feb. 18, 2020.

Office Action issued in U.S. Appl. No. 15/825,849, dated Jul. 6, 2020.

* cited by examiner

METHOD AND SYSTEM FOR MANAGING, OPTIMIZING, AND ROUTING INTERNET TRAFFIC FROM A LOCAL AREA NETWORK (LAN) TO INTERNET BASED SERVERS

The current application claims a priority to the U.S. Provisional Patent Application Ser. No. 61/710,026, filed on Oct. 5, 2012.

FIELD OF INVENTION

The present invention relates generally to managing data transfer over a network. More specifically, the present invention is a method and system which identifies latency sensitive data and next routes the latency sensitive data through a specific path that allows for minimum latency, hops, and packet loss.

BACKGROUND OF INVENTION

Like the real word traffics, the internet traffics become important and meanwhile overburdened by all kinds of data being transferred over the internet. Online activities such as gaming and streaming videos or audios have become extremely common forms of recreation in the modern life. Both streaming videos and playing computer or console games over the internet require fast network connections that are capable of transmitting data at high speeds. In some cases, one of the most important issues of data transfer over a network is the latency experienced by the data packets, when in transit. Latency is best understood as a time delay between when the data is sent and when the data is received. The effects of latency are most detrimental to gaming in which the data being transferred contains information about a player's actions. When latency is high, the time delay between when the player takes an action and when the game registers or carries out that action can be very detrimental to the player's gaming experience. High latency can make the game difficult, or even impossible to play with any success.

The latency issues in gaming are primarily caused when an internet service provider does not recognize that internet data being sent out from a game application is latency sensitive. Resultantly, the internet data sent out from the game application may not be treated properly and may be sent through the shaped ports that regulate or restrict the rate of internet data flowing through them. Additionally the internet data may be sent through routers that are known chokepoints or experience a high rate of packet loss. All of these issues result in the players experiencing much more latency during their game playing or other activities. The root of the problem is what has been mentioned above; the fact that the internet service providers are incapable of recognizing and properly routing latency sensitive data such that minimal latency would be experienced by the player. This is primarily an issue in online gaming; however there are other latency sensitive online activities, such as voice communication, that can suffer from the similar problems.

On the other hand, it has been noted that not all internet data are latency sensitive; some internet data are more dependent on bandwidth. Online activities such as downloading files and streaming videos are good examples of the activities that require high bandwidth, but do not necessarily suffer from latency issues. Unfortunately, online activities requiring high bandwidth can suffer from performance problems born from the same routing issues discussed above. If high bandwidth internet data is routed through a path which comprises routers and servers that are shaped or throttled, significant losses in data transmission rates can be observed. This can adversely affect the experience of a user; increasing video load times and increasing the time required to download files. Therefore, it is an objective of the present invention to overcome the routing issues causing the performance problems discussed above by creating a system and method by which internet data will be identified and routed more efficiently, thus providing significant performance boosts to the user of the present invention.

BRIEF DESCRIPTION OF THE DRAWINGS

FIG. 1 is a flow chart depicting the basic decisions carried out by the software when the internet data is processed and the resulting route the data may be forced through.

DETAILED DESCRIPTIONS OF THE INVENTION

All illustrations of the drawings and descriptions of embodiments are for the purpose of describing selected versions of the present invention and are not intended to limit the scope of the present invention.

The present invention is a method and system for managing, optimizing, and routing internet traffic from a local area network (LAN) to internet based servers, the destination servers. The present invention comprises a system and a method. The system of the present invention allows the method of the present invention to be effectively carried out to optimize routing of internet traffic and thereby increase internet performance especially with respect to latency sensitive activities such as gaming or voice communication. The present invention is also capable of improving the performance of bandwidth intensive activities such as downloading files. The system comprises software and a gamer private network or GPN for short.

Figure 1:
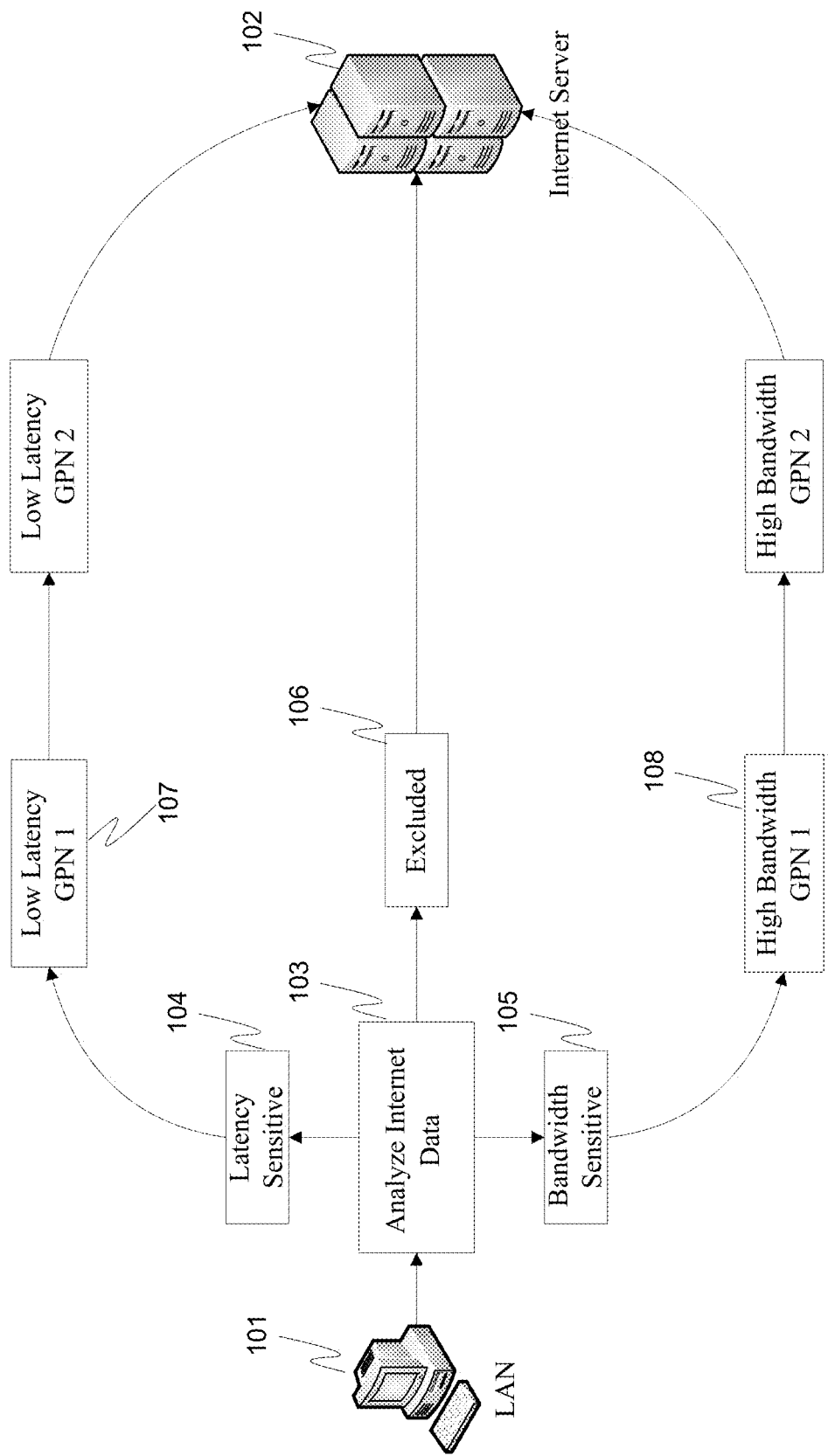

The software may be installed onto a user's computer and is responsible for analyzing all internet data 103 that is traveling out of the LAN 101, to the respective destination internet server 102. The software is also responsible for classifying the internet data as either latency sensitive 104, bandwidth sensitive 105, or not latency sensitive and not bandwidth sensitive. Next, the latency sensitive and bandwidth sensitive data are triaged to be sent out along the respective specific routes 107 and 108. The software is also able to determine if certain internet data should be excluded 106 from the rerouting normally done by the software. Normally, they are the data that are not latency sensitive and are not bandwidth sensitive, either. This process can be seen in FIG. 1, which displays a flowchart of the basic decision made by the software and the resulting route the internet data is forced to take.

In addition to the aforementioned gateway solution, a master-slave computer system can also be employed to provide a solution to the LAN. In this approach, a master computer is assigned on the LAN. Usually it is the same computer that is set as the gateway computer in the first approach. Other devices within the same LAN would be set as the slave computers or slave devices. A small application would be installed on the slaves to manage the traffic on the slave devices, controlled by the master computer. In many cases latency experienced on a LAN is due to mismanagement of available bandwidth on the LAN. Using the master-slave system would be an effective way to manage LAN bandwidth. The master-slave system would monitor LAN network performance, always ensuring optimal latency and minimal flux/spikes for latency sensitive data. The LAN bandwidth usage would be monitored and the corresponding bandwidth on devices may be automatically throttled if it results in degradation of performance for latency sensitive data on the LAN. Through the master-slave monitoring and control, it would be able to detect the "tipping point", ensuring that LAN bandwidth can be as high as possible, but immediately throttle bandwidth once degradation in network performance is noticed, which will impact latency sensitive data. This control will allow a good balance of bandwidth and performance; while the master computer could adjust this balance as required.

The software determines latency sensitive, bandwidth sensitive, and not latency sensitive not bandwidth sensitive classifications based upon a set of rules. The set of rules that determine whether or not the internet data is latency sensitive or not may be stored locally within the program files of the software. In this case, the set of rules needs to be updated every once in a while to ensure that the set of rules being used by the software is the most up to date set of rules being used by the present invention. The set of rules is updated via a quick download from the internet as is commonplace in the field of computing to keep programs and games up to date. Alternatively, the set of rules may be stored on a server which is accessed by the software through a network connection.

Figure 2:
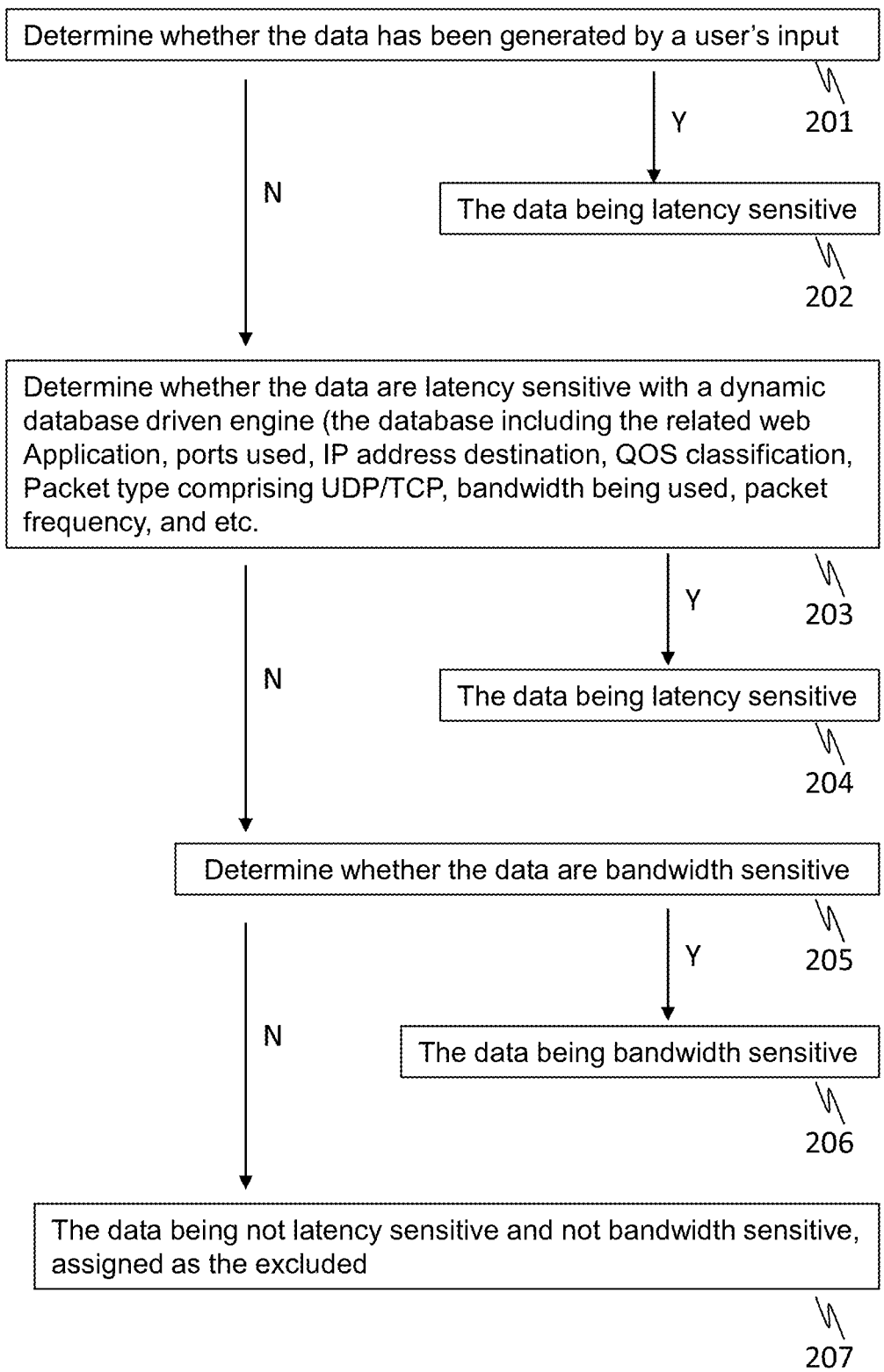
FIG. 2 is a flow chart depicting the basic procedure whereby the characteristic of the internet data sent out are determined and thus sorted.

In particular, as shown in FIG. 2, the internet data are firstly checked whether it is the data generated by a user's input 201. As the rule of thumb is that the data or action generated by a user is the latency sensitive data, and such data will always be treated as the latency sensitive data 202. Following this step, the data that are not generated by a user's input will next be determined whether the data are latency sensitive data. A dynamic database driven engine where different traffic patterns and classifications can be stored will be used to automatically identify the flow of latency sensitive data 203. This database will be updated frequently in order to make the determination of latency sensitivity as accurate as possible. Many different characteristics regarding the type (latency sensitivity) of data are incorporated in the database, such as the web application being used, port(s) used, IP address destination for the traffic, QOS classifications (Quality of service, in computer network trafficking it refers to resource reservation control mechanisms), packet type (such as UDP/TCP, i.e., Transmission Control Protocol and User Datagram Protocol), the bandwidth used and the packet frequency, and so on. This list is not exhaustive and is actually frequently modified. So, the traffic data flow is compared against this dynamic database to determine whether it is latency sensitive or not.

Following the foregoing procedure, the data are further sorted as the latency sensitive data 204, and the remaining, which will be further determined of their sensitivity to the bandwidth 205. In the case when the data are determined to be bandwidth sensitive data 206, it will be rerouted to the pathway that is specific for the bandwidth sensitive data. The remaining data, which are neither latency sensitive data nor bandwidth sensitive data, will be assigned as the excluded 207, i.e., they will be excluded from the rerouting process; and thus will go through the routine internet connection to their respective destination. The sorted latency sensitive data or flow will be rerouted to the specific route, the Gamers Private Network (GPN), which allows the minimal latency, hop, loss, and etc.

Figure 3:
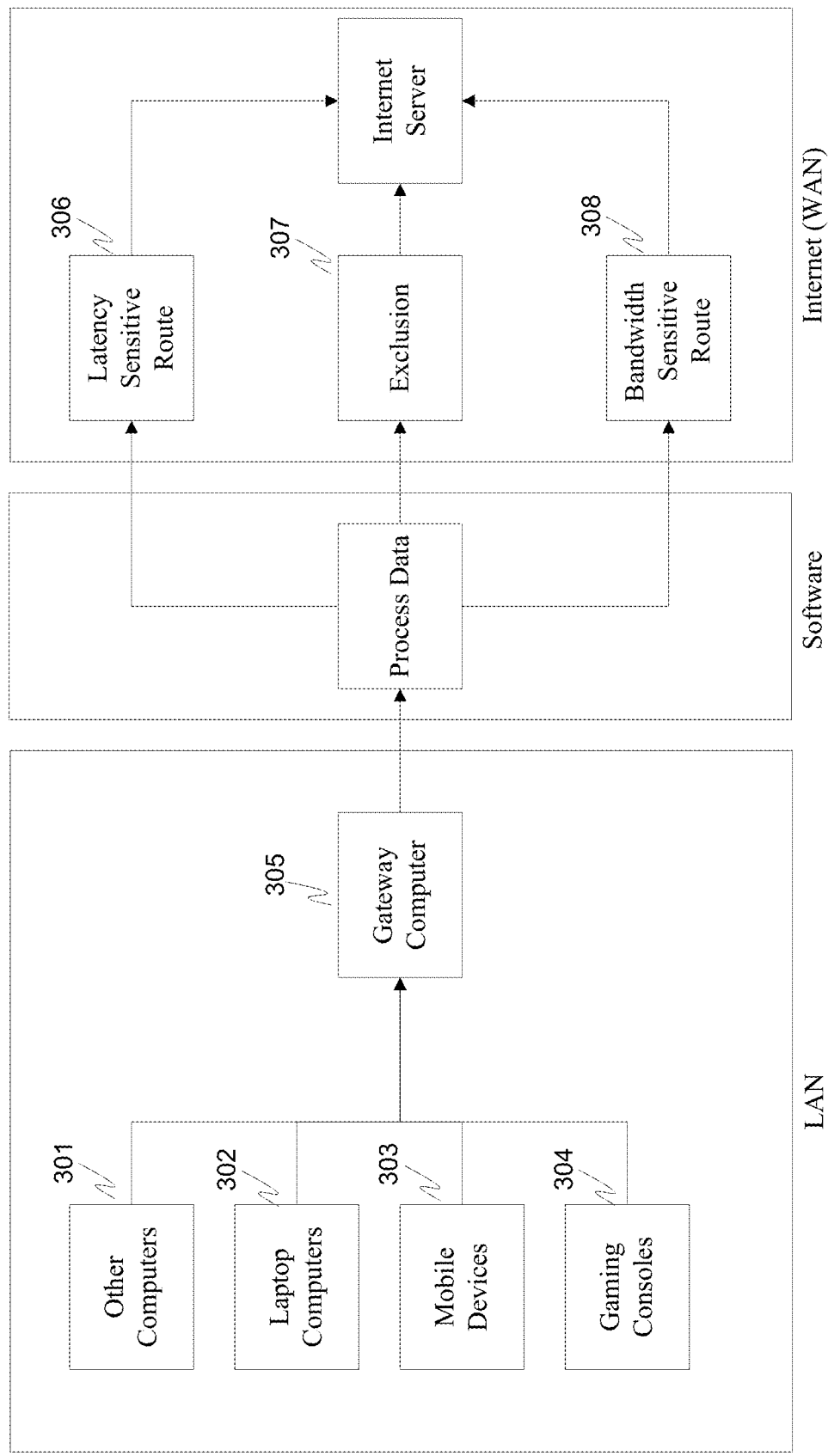
FIG. 3 is a flow chart depicting how the computer with the software installed may serve as a gateway computer for the LAN, thus, allowing all internet accessing devices within the LAN to benefit from the functions of the present invention.
Figure 4:
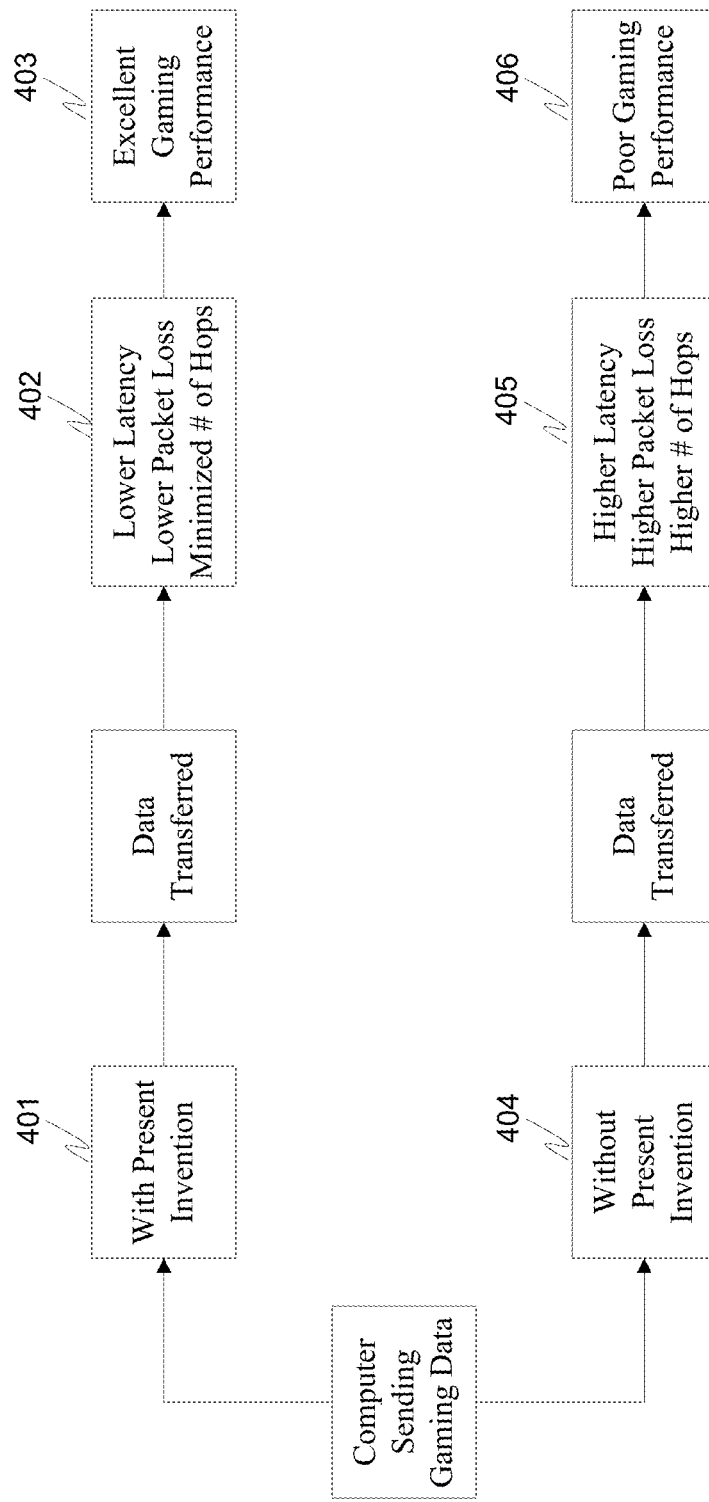
FIG. 4 is a flow chart showing a comparison between gaming while using the present invention and gaming while not using the present invention.

In reference to FIGS. 3 and 4, for each local area network (LAN), there would be at least one computer or the like that has been installed with the software that makes it function as a gateway computer 305 to access to the Gamer Private Network (GPN). As for the LAN, it may not only comprise computers, including the gateway computer 305 and other computers 301, laptop 302, tablet, and etc, but also comprise mobile phones 303 and gaming consoles 304. Via the designated gateway computer, the data flow from each device within the LAN can be rerouted to the GPN, as long as such flow or data has been classified as the latency sensitive data. Moreover, as described previous, the data sent from a device of the LAN may be transmitted to the respective destination server through different type of route, namely they may be rerouted to the GPN latency sensitive route 306, rerouted to the bandwidth sensitive route 308 or the routine route 307 that is excluded from the rerouting process if the data are neither latency sensitive nor bandwidth sensitive.

The effect of rerouting the latency sensitive data to the GPN would be very significant. As shown in FIG. 4, the data flow transmission to the destination server following the routine route without implementation of the present invention 404 may have the issues of high latency, high packet loss and high number of hops 405; and thus result in a very poor gaming performance 406. In contrast, with the implementation of the present invention 401, the data transfer will be much more smooth with quite low latency, low packet loss and low number of hops 402. And all of these factors will contribute to the user's excellent gaming performance 403. It may make online game connections up to 70% faster, smoother and stronger.

In addition to the aforementioned significantly improved gaming experience, another fundamental feature of the present invention would be that it is a true client (gamer) based solution for intelligently delivering or routing the traffic and data flow. Traditionally, the content delivery networks (CDNs) deliver data via a top down style approach. Those large companies decide how data should flow from their servers from the top level, to the users who are down at the bottom. Following this process, most of user's data flows will be indiscriminately transmitted, regardless of the property, sensitivity of the data, as well as the user's favor and experience. With the WTFast solution of the present invention, which utilizes the specific GPN network to transfer the sorted latency sensitive data, it has flipped it upside down to a bottom up style, wherein the users have a say about how his or her data should be transferred. In this way, the users are in control of their data's transmission over the internet. WTFast is the first such service in the world, which functions like a consumer driven CDN. So, by virtue of the WTFast technology, the average consumers are bestowed the capability of access to the global CDN infrastructure.

Figure 5:
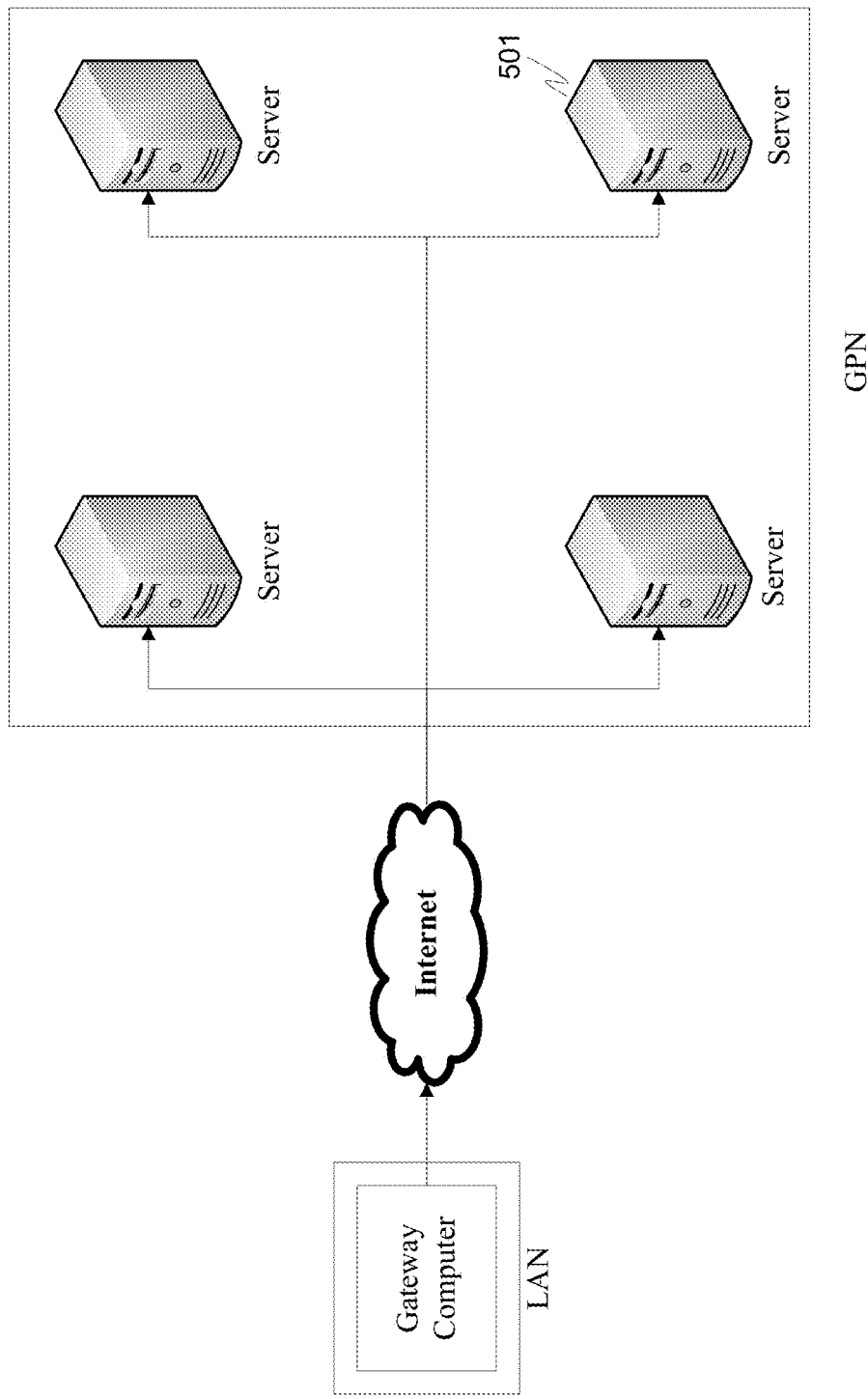
FIG. 5 is a flow chart showing a conceptualization of the GPN of the present invention.

Concerning the GPN of the present invention, it includes a plurality of servers 501 which are located around the world, as shown in FIG. 5. The global distribution of the plurality of servers ensures that a good connection can be established between the GPN and the individual gateway computers. When the internet data that is classified as latency sensitive is sent from or through a gateway computer, the software installed on the gateway computer will reroute the internet data such that the internet data is sent between the plurality of servers of the GPN for as long as possible before being handed over to either internet service provider (ISP) servers or directly to the destination server. Among them, handing the internet data from the gateway computer via the GPN directly to the destination server is the most ideal approach, as this allows the internet data to avoid the often unreliable performance of internet service provider servers and routers, which is particularly critical for the latency sensitive data.

Figure 6:
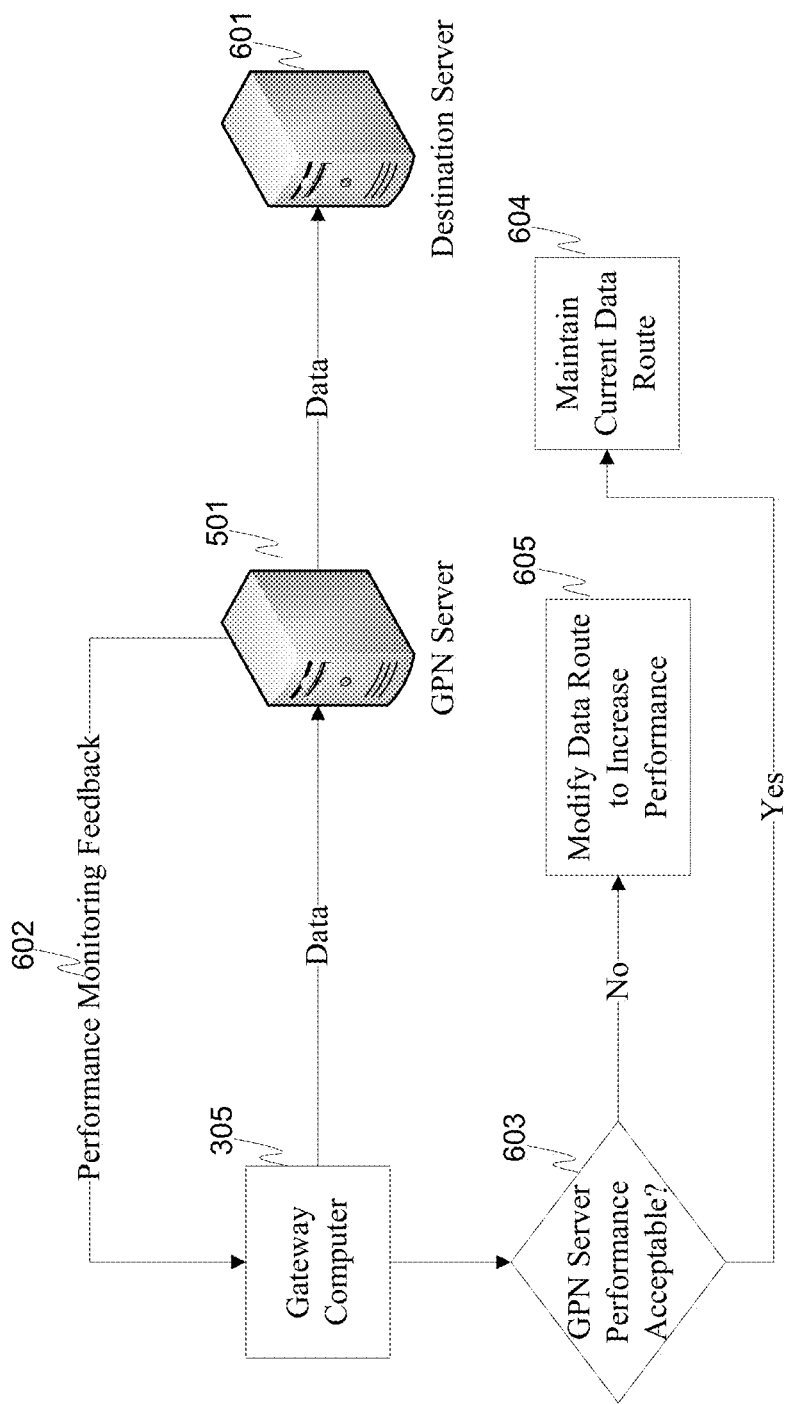
FIG. 6 is a flow chart depicting how the present invention utilizes performance information about the plurality of servers of the GPN as feedback to further optimize the route taken by the internet data.
Figure 7:
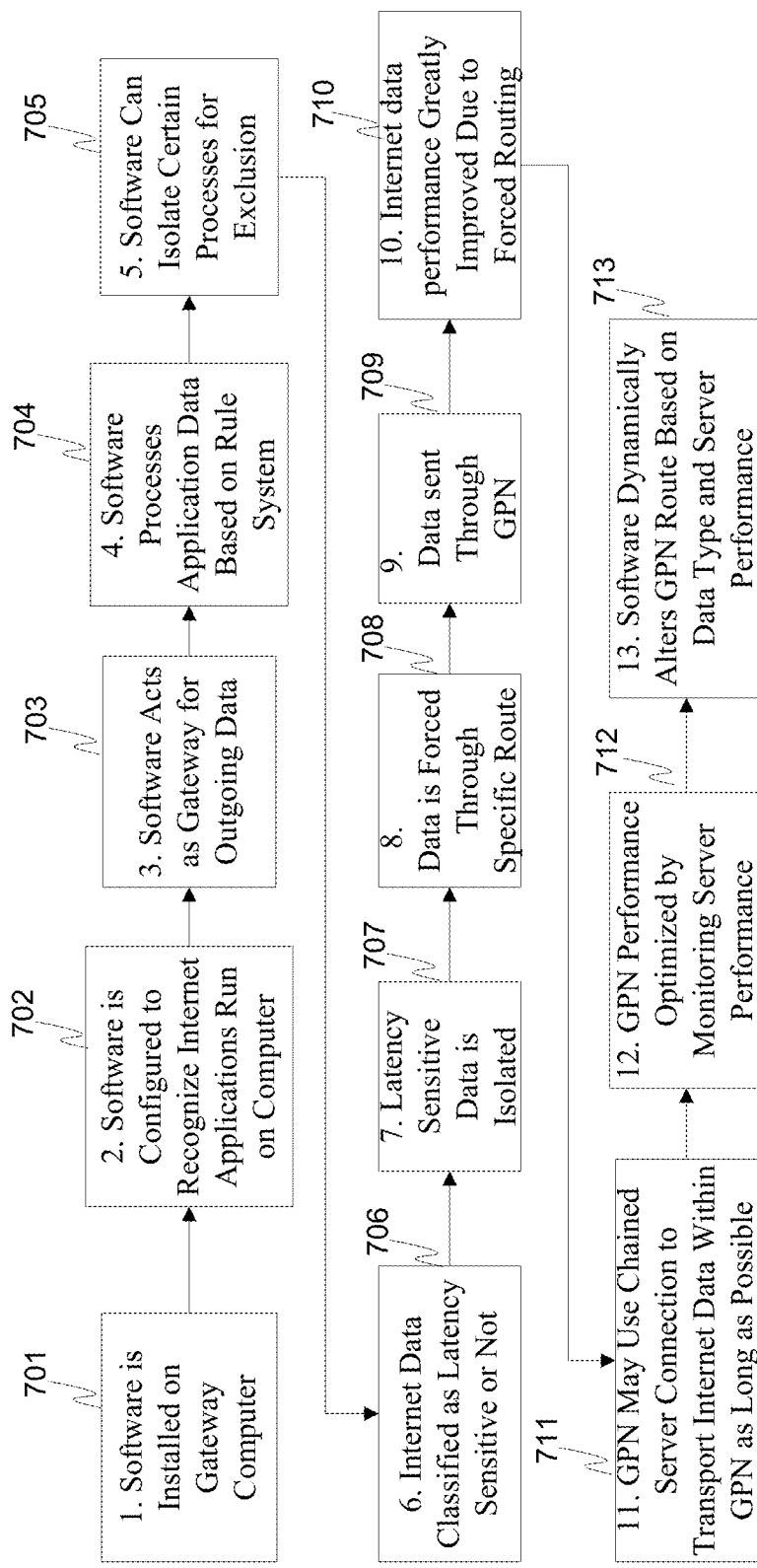
FIG. 7 is a flow chart showing the overall steps followed by the method of the present invention.

Due to the dynamic real time internet traffic conditions, the best available GPN server connection for a particular destination server may change frequently. The GPN route is continuously monitored and accordingly modified, so as to reach the optimal traffic route for a respective latency sensitive traffic. Therefore, GPN is rather a dynamic route than a fixed one. In reference to FIG. 6, during the process of data transmission from the gateway computer to the destination server 601 by way of GPN that includes a series of GPN servers 501, the condition and performance of data transfer has been continuously monitored, and the feedback will be sent back 602 to the gateway computer for analysis. It will be determined whether the GPN performance is acceptable, against a pre-determined threshold 603. If the GPN performance is determined to be acceptable, the current GPN route will be maintained and no need to make a change 604. But if the performance of the current GPN route is not acceptable, the GPN route will be modified in order to improve its performance 605. In the present invention, the GPN monitoring system keeps monitoring the server to server connections of the GPN. This kind of monitoring function ensures the optimal server to server connections within the GPN network. The aim is to control as many as possible of these connections as possible from end to end within the GPN route. In this way, as long as the latency sensitive data has been rerouted to the GPN network of the present invention, the data transmission results would be known. On the other hand, when data are currently not within the GPN network of the present invention, the transmission result would not be known; so certain estimation and approximations need to be made in order to optimize the transmission route, the connections between the respective servers, and the connections between the GPN network and the unknown networks. This is true in many cases with destination servers. This is especially true in cases where certain parts of the Internet "trip" block network monitoring tools. Therefore, if more of the connection end to end via the GPN can be controlled, the reliability of the entire transmission will be greatly improved, such as the improvements of average latency, flux/deviation and latency spikes. However, if a large portion of the Internet trip is unknown or uncontrolled, the reliability of the data transmission would be significantly reduced.

The method is the overall process followed by the present inventions and comprises the following basic steps which are described in detail in the subsequent paragraphs. Step one 701; the software is installed onto a computer, thus, creating the gateway computer as defined above. The software operates to optimize and improve routing for data traffic as described above.

Step two 702; the software is configured to recognize, identify, and process applications run on the gateway computer that send data over the internet. This identification process allows the software to determine which applications that are running on the gateway computer.

Step three 703; the software acts as a gateway as all outgoing internet traffic from the LAN is sent through the gateway computer. This is important as the gateway computer may serve to reroute the internet data coming from a multitude of different computers and devices that are part of the LAN. This is depicted in FIG. 3 which shows how multiple internet enabled devices may receive the benefits of the present invention as all latency sensitive internet data sent out of the LAN is sent out through the gateway computer.

Step four 704; the software processes all the internet data sent through the gateway computer based upon the set of rules as discussed above. In the preferred embodiment of the present invention, the set of rules uses primarily port information, QOS and the internet protocol destination address to determine whether or not the internet data is latency sensitive. It is understood that other methods of identifying whether or not the internet data is latency sensitive may be used without departing from the scope and spirit of the present invention.

Step five 705; the software identifies and isolates specific processes that are sending internet data, excluding that internet data from being sent over the GPN. The processes excluded from the GPN in this step are most commonly secure connections such as those to a virtual private network, or logins. By excluding such processes, the present invention dissuades potential antagonists such as hackers from using the present invention to their advantage for committing acts such as theft of accounts and passwords.

Step six 706; the internet data sent through the gateway computer is classified as either latency sensitive or non latency sensitive. The classification of the internet data is done using the rule set mentioned above.

Step seven 707; the internet data that is classified as latency sensitive is isolated and forced to be sent out of the LAN via a non-shaped port. The internet data classified as latency sensitive may also be tagged or otherwise marked such that it can be more readily identified by routers and servers as latency sensitive.

Step eight 708; the internet data is dynamically routed through the GPN. The rule system determines whether or not all or only a portion of the internet data is routed through the GPN. A good example of this can be seen in online games which often use a combination of both latency sensitive and non latency sensitive internet data. The internet data from online games that is latency sensitive contains information about player actions. The non latency sensitive internment data sent out by online games includes things like login information and update or patch downloads which contain new program files meant to optimize the game or fix issues. The ability to separate out which portions of the internet data sent by a single application or game is crucial to keeping the network connections of the GPN which are reserved for latency sensitive data performing at maximum. Other portions of the GPN are reserved for internet data that requires high bandwidth to be sent quickly. An example of internet data that requires the use of high bandwidth servers includes downloading patches and updates and streaming videos.

Step nine 709; the internet data sent through the GPN is forced to take the most efficient path through the GPN. The performance of all the servers in the GPN is monitored and routing of the internet data through the GPN is done based upon the real time performance values of the plurality of servers within the GPN. A flowchart depicting this feedback base routing can be seen in FIG. 6.

Step ten 710; the performance of sending and receiving internet data is greatly improved by ensuring that the local internet service provider treats the internet data marked as latency sensitive appropriately. The forced routing used by the present invention removes choke points as well as routers that have high packet loss from the route taken by the internet data. Additionally, the number of transfers from router to router or server to server between the LAN and the destination server is greatly reduced. The reduction in transfers also helps to improve performance as packet loss is minimized or altogether eliminated.

Step eleven 711; the GPN may use a chained server connection. The chained server connection ensures that the transfer from internet service providers and GPN is as close to the LAN as possible. The closer the GPN servers are to the LAN, the higher the potential for improved performance when using the present invention. The chained server connection of the GPN ensures that the internet data stays on the GPN for as long as possible during the route from start to finish, thus, ensuring maximum performance gain when using the present invention.

Step twelve 712; the performance of the GPN is optimized by constantly monitoring performance metrics of the plurality of servers within the GPN in real time. This information can be used by the software to intelligently route the internet data through the GPN.

Step thirteen 713; the software dynamically alters the route through the GPN taken by the internet data based upon the performance metrics of the plurality of servers of the GPN measured in step twelve. Additionally, the software uses information about the destination server to influence the route taken through the GPN by the internet data. This dynamic routing maximizes performance gain can be experienced by the user of the present invention.

Although the present invention has been explained in relation to its preferred embodiment, it is to be understood that many other possible modifications and variations can be made without departing from the spirit and scope of the invention as herein described.

What is claimed is:

1. A non-transitory computer-readable medium that stores instructions executable by one or more processors to perform a method for optimizing internet traffic from a local area network to an internet based server connected to internet, comprising:
    instructions for establishing the local area network, wherein the local area network comprises at least one device and has a first connection to the internet;
    instructions for designating a first device in the at least one device within the local area network as a gateway computer;
    instructions for analyzing an internet data by the gateway computer to determine a data that is latency sensitive and a data that is not latency sensitive;
    instructions for routing, by the gateway computer located inside the local area network, the data that is latency sensitive outside the local area network through the first connection to a first internet route outside the local area network to the internet based server, and transmitting, by the gateway computer located inside the local area network, the data that is not latency sensitive through the first connection through at least another internet route outside the local area network to the internet based server;
    instructions for analyzing a performance of the first internet route to the internet based server;
    instructions for dynamically modifying the first internet route outside the local area network within the internet and rerouting the data outside the local area network to the internet based server based on the performance;
    instructions for determining whether the internet data are generated by a user input; and
    instructions for sorting the internet data generated by the user input into the data that is latency sensitive or the data that is not latency sensitive.

2. The non-transitory computer-readable medium of claim 1, wherein the at least one device is an internet enabled computing device.

3. The non-transitory computer-readable medium of claim 1, further comprising:
    instructions for directing the internet data from the at least one device in the local area network to the gateway computer;
    wherein the instructions for analyzing the internet data by the gateway computer to determine the data that is latency sensitive and the data that is not latency sensitive comprises:
        instructions for sorting the internet data into a plurality of categories, wherein the plurality of categories comprises a latency sensitive category and a not latency sensitive category, wherein the data that is latency sensitive is sorted into the latency sensitive category.

4. The non-transitory computer-readable medium of claim 3, further comprising:
    instructions for establishing a first criterion of a set of internet data features;
    instructions for analyzing the internet data not generated by the user input based on the first criterion;
    instructions for sorting the internet data not generated by the user input into the latency sensitive category, when the internet data not generated by the user input meet the first criterion.

5. The non-transitory computer-readable medium of claim 4, wherein the set of internet data features comprises at least one data feature selected from a list consisting of type of internet application, type of data port, destination Internet Protocol (IP) address, quality of service (QOS) classification, type of data packet, bandwidth being used, and packet frequency.

6. The non-transitory computer-readable medium of claim 4, further comprising:
    instructions for establishing a second criterion;
    instructions for analyzing the data that is not latency sensitive, wherein the not latency sensitive category comprises a bandwidth sensitive category and an exclusion category;
    instructions for determining whether the data that is not latency sensitive is bandwidth sensitive data based on the second criterion; and
    instructions for sorting the bandwidth sensitive data into the bandwidth sensitive category.

7. The non-transitory computer-readable medium of claim 6, further comprising:

instructions for sorting a remaining data into a category of exclusion, wherein the remaining data has not been sorted into the latency sensitive category or the bandwidth sensitive category.

8. The non-transitory computer-readable medium of claim 7, further comprising:
instructions for routing the data sorted in the bandwidth sensitive category to a second internet route to the internet based server;
instructions for excluding the data sorted in the exclusion category from the first internet route and from the second internet route; and
instructions for transmitting the data sorted in the exclusion category to a third internet route to the internet based server.

9. The non-transitory computer-readable medium of claim 3, further comprising:
instructions for identifying internet data of secure connection; and
instructions for excluding the identified internet data of secure connection from being sorted and routed by the gateway computer.

10. The non-transitory computer-readable medium of claim 1,
wherein the first internet route is a gamer private network;
wherein the gamer private network comprises a plurality of computer servers and a plurality of connections between the plurality of computer servers; and
wherein the plurality of computer servers are distributed.

11. The non-transitory computer-readable medium of claim 10, further comprising:
instructions for continuously monitoring a performance of the gamer private network;
instructions for sending a feedback of performance to the gateway computer;
instructions for establishing a performance threshold;
instructions for determining whether the performance of the gamer private network is acceptable based on the performance threshold; and
instructions for modifying server connections within the gamer private network if the performance is not acceptable based on the performance threshold.

12. The non-transitory computer-readable medium of claim 1, wherein the local area network comprises the at least one device and has a single connection to the internet.

13. A non-transitory computer-readable medium that stores instructions executable by one or more processors to perform a method for optimizing internet traffic from a local area network to an internet based server connected to internet, comprising:
instructions for establishing the local area network, wherein the local area network comprises at least one device, wherein the local area network has a first connection to the internet;
instructions for designating a first device in the at least one device within the local area network as a gateway computer;
instructions for directing data from any device in the local area network to the gateway computer;
instructions for sorting the data into at least one of categories comprising a latency sensitive category, a bandwidth sensitive category, and an exclusion category;
instructions for selecting, by the gateway computer located inside the local area network, an internet route through the first connection for the data to the internet based server based on the at least one of categories, wherein a latency sensitive internet route through the first connection is selected for data sorted in the latency sensitive category, wherein a bandwidth sensitive internet route through the first connection is selected for data sorted in the bandwidth sensitive category, wherein an exclusion internet route through the first connection is selected for data sorted in the exclusion category;
instructions for sending out the data by the gateway computer located inside the local area network to the internet based server via the selected internet route;
instructions for dynamically rerouting, by the gateway computer located inside the local area network, the data outside the local area network to the internet based server based on the at least one of categories;
instructions for determining whether the data are generated by a user input; and
instructions for sorting the data generated by the user input into the latency sensitive category, the bandwidth sensitive category, or the exclusion category.

14. The non-transitory computer-readable medium of claim 13, further comprising:
instructions for excluding the data sorted in the exclusion category from the latency sensitive internet route and from the bandwidth sensitive internet route;
wherein the latency sensitive internet route is a gamer private network;
wherein the gamer private network comprises a plurality of computer servers and a plurality of connections between the plurality of computer servers; and
wherein the plurality of computer servers are distributed.

15. The non-transitory computer-readable medium of claim 14, further comprising:
instructions for continuously monitoring a performance of the gamer private network;
instructions for sending a feedback of performance to the gateway computer;
instructions for establishing a performance threshold;
instructions for determining whether performance of the gamer private network is acceptable based on the performance threshold; and
instructions for modifying server connections within the gamer private network if the performance of the gamer private network is not acceptable based on the performance threshold.

16. A non-transitory computer-readable medium that stores instructions executable by one or more processors to perform a method for optimizing internet traffic from a local area network to an internet based server connected to internet, comprising:
instructions for establishing the local area network, wherein the local area network has a first connection;
instructions for assigning a first computer in the local area network as a master device;
instructions for analyzing an internet data traveling out of the local area network by the master device;
instructions for assigning a device in the local area network except the first computer as a slave device;
instructions for the master device located inside the local area network controlling data traffic from the slave device;
instructions for directing the internet data from the slave device in the local area network to the master device;
instructions for sorting and routing the internet data outside the local area network to the internet based server by the master device located inside the local area network;

instructions for identifying internet data of secure connection;
instructions for excluding the identified internet data of secure connection from being sorted and routed by the master device located inside the local area network to the internet based server;
instructions for determining whether the internet data are generated by a user input; and
instructions for sorting the internet data generated by the user input into a latency sensitive data or a not latency sensitive data;
wherein the instructions for sorting the internet data by the master device comprises instructions for sorting the internet data into one or more categories by the master device, the one or more categories comprising a latency sensitive category, a bandwidth sensitive category, and an exclusion category;
wherein the instructions for routing the internet data outside the local area network by the master device comprises instructions for routing the internet data outside the local area network in the latency sensitive category to a latency sensitive internet route; instructions for routing the internet data in the bandwidth sensitive category to a bandwidth sensitive internet route; instructions for excluding the internet data in the exclusion category from the latency sensitive internet route and from the bandwidth sensitive internet route; and instructions for transmitting the internet data in the exclusion category in an exclusion internet route;
wherein the latency sensitive internet route, the bandwidth sensitive internet route, and the exclusion internet route are different routes to the internet based server through the first connection.

17. The non-transitory computer-readable medium of claim 16, further comprising:
instructions for establishing a first criterion of a set of internet data features;
instructions for analyzing the internet data not being generated by user input based on the set of internet data features;
instructions for sorting the internet data not being generated by the user input into the latency sensitive category, when the internet data not being generated by the user input meet the first criterion;
instructions for sorting the internet data not being sorted into the latency sensitive category;
wherein the set of internet data features comprises at least one data feature selected from a list consisting of type of internet application, type of data port, destination Internet Protocol (IP) address, quality of service (QOS) classification, type of data packet, bandwidth being used, and packet frequency;
wherein the type of data packet comprises User Datagram Protocol (UDP) and Transmission Control Protocol (TCP);
instructions for establishing a second criterion;
instructions for determining whether the internet data not sorted into the latency sensitive category are bandwidth sensitive according to the second criterion;
instructions for sorting the internet data not being sorted into the latency sensitive category into the bandwidth sensitive category, when the determination is yes; and
instructions for sorting a remaining internet data into a category of exclusion, wherein the remaining internet data do not belong to the latency sensitive category and the remaining internet data do not belong to the bandwidth sensitive category.

18. The non-transitory computer-readable medium of claim 16, further comprising:
instructions for continuously monitoring a performance of the latency sensitive internet route;
instructions for sending a feedback of performance of the latency sensitive internet route to the master device;
instructions for establishing a performance threshold;
instructions for determining whether the performance of the latency sensitive internet route is acceptable based on the performance threshold; and
instructions for modifying server connections within the latency sensitive internet route if the determination is no.

19. A non-transitory computer-readable medium that stores instructions executable by one or more processors to perform a method for optimizing internet traffic from a local area network to an internet based server connected to internet, comprising:
instructions for establishing the local area network, wherein the local area network comprises at least one device and has a first connection to the internet;
instructions for designating a first device in the at least one device within the local area network as a gateway computer;
instructions for analyzing an internet data by the gateway computer to determine a data that is latency sensitive and a data that is not latency sensitive;
instructions for routing, by the gateway computer located inside the local area network, the data that is latency sensitive outside the local area network through the first connection and through a first internet route to a private network outside the local area network and from the private network to the internet based server, and transmitting, by the gateway computer located inside the local area network, the data that is not latency sensitive through the first connection and through at least another internet route outside the local area network to the internet based server;
instructions for analyzing a performance of the first internet route to the internet based server;
instructions for dynamically modifying the first internet route outside the local area network within the internet and rerouting the internet data outside the local area network to the internet based server based on the performance; and
instructions for determining whether the internet data are generated by a user input.

20. The non-transitory computer-readable medium of claim 19, further comprising instructions for analyzing the performance of the first internet route to the private network and from the private network to the internet based server.

21. The non-transitory computer-readable medium of claim 20, further comprising instructions for dynamically modifying an internet route within the private network and rerouting the data within the private network to the internet based server based on the performance.

* * * * *